US012688559B1

(12) United States Patent
Lebrun et al.

(10) Patent No.: US 12,688,559 B1
(45) Date of Patent: Jul. 21, 2026

(54) IMAGE CAPTURE DEVICE WITH FACE BLURRING

(71) Applicant: GoPro, Inc., San Mateo, CA (US)

(72) Inventors: Marc Lebrun, Issy-les-Moulineaux (FR); Moctar Mounirou Arouna LM, Montrouge (FR); Jean-Marc Thiesse, Saint-Cyr-l'école (FR); Maxime Bichon, San Mateo, CA (US); Martin Raoul, Elancourt (FR)

(73) Assignee: GoPro, Inc., San Mateo, CA (US)

( * ) Notice: Subject to any disclaimer, the term of this patent is extended or adjusted under 35 U.S.C. 154(b) by 14 days.

(21) Appl. No.: 18/758,315

(22) Filed: Jun. 28, 2024

(51) Int. Cl.
    *G06T 5/70* (2024.01)
    *G06T 7/73* (2017.01)
    *G06V 40/16* (2022.01)
(52) U.S. Cl.
    CPC .................. *G06T 5/70* (2024.01); *G06T 7/74* (2017.01); *G06V 40/161* (2022.01); *G06T 2207/10016* (2013.01); *G06T 2207/20092* (2013.01); *G06T 2207/30201* (2013.01)
(58) Field of Classification Search
    CPC ... G06T 5/70; G06T 7/74; G06T 2207/10016; G06T 2207/20092; G06T 2207/30201; G06V 40/161

USPC ........................................................ 348/207.1
See application file for complete search history.

(56) References Cited

U.S. PATENT DOCUMENTS

| | | | |
|---|---|---|---|
| 8,977,003 B1 * | 3/2015 | Kwan .................... | G06V 40/16 |
| | | | 382/103 |
| 9,224,211 B2 * | 12/2015 | Wang ...................... | G06T 7/269 |
| 2021/0406520 A1 * | 12/2021 | Ito ......................... | G06V 10/776 |
| 2024/0127857 A1 * | 4/2024 | Caba Heilbron ...... | G06V 20/41 |

* cited by examiner

*Primary Examiner* — Lin Ye
*Assistant Examiner* — Chan T Nguyen
(74) *Attorney, Agent, or Firm* — Esplin & Associates, PC

(57) ABSTRACT

An image capture device captures video frames using a capture rate. The image capture device performs face detection on the video frames using a face detection rate slower than the capture rate. Temporal filtering is applied to determine the positions and sizes of the faces within the video frames in which face detection has not been performed. Tracking filtering is applied to determine the positions and sizes of the faces within the video frames in which face detection has failed. One or more of the faces within the video frames are blurred, and the blurred video frames are transmitted to a computing device.

17 Claims, 6 Drawing Sheets

METHOD 200

201 — Capture video frames, the video frames depicting faces, wherein a capture rate defines a rate at which the video frames are captured.

202 — Detect the faces depicted within the video frames, the detection of the faces depicted within the video frames including determination of positions and sizes of the faces, wherein a face detection rate defines a rate at which the faces are detected within the video frames, the face detection rate slower than the capture rate.

203 — Apply a temporal filtering to determine the positions and the sizes of the faces within the video frames in which the detection of the faces has not been performed.

204 — Apply a tracking filtering to determine the positions and the sizes of the faces within the video frames in which the detection of the faces has failed.

205 — Blur the video frames based on the positions and the sizes of the faces within the video frames, wherein one or more of the faces within the video frames are blurred.

206 — Transmit the blurred video frames to a computing device.

METHOD 200

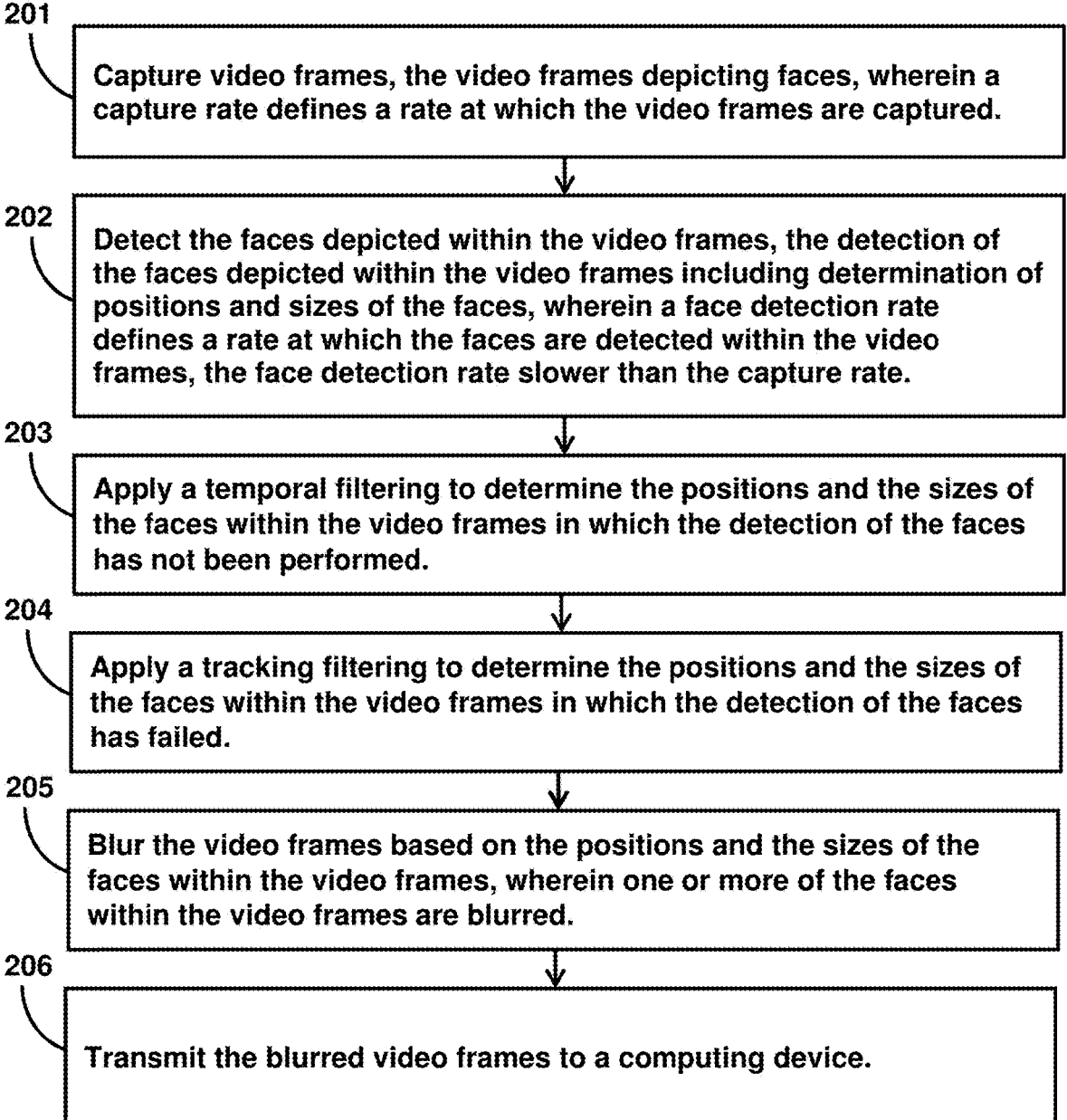

201

Capture video frames, the video frames depicting faces, wherein a capture rate defines a rate at which the video frames are captured.

202

Detect the faces depicted within the video frames, the detection of the faces depicted within the video frames including determination of positions and sizes of the faces, wherein a face detection rate defines a rate at which the faces are detected within the video frames, the face detection rate slower than the capture rate.

203

Apply a temporal filtering to determine the positions and the sizes of the faces within the video frames in which the detection of the faces has not been performed.

204

Apply a tracking filtering to determine the positions and the sizes of the faces within the video frames in which the detection of the faces has failed.

205

Blur the video frames based on the positions and the sizes of the faces within the video frames, wherein one or more of the faces within the video frames are blurred.

206

Transmit the blurred video frames to a computing device.

FIG. 2

IMAGE CAPTURE DEVICE WITH FACE BLURRING

FIELD

This disclosure relates to an image capture device for blurring faces captured within videos.

BACKGROUND

An image capture device may be used to record a video of a scene that includes people. The user of the image capture device may wish to blur one or more faces captured in the video before transmitting (e.g., streaming) the video to a computing device.

SUMMARY

This disclosure relates to an image capture device for blurring faces captured within videos. The image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content. Video frames may be captured based on the visual content and/or other information. The video frames may depict faces. A capture rate may define a rate at which the video frames are captured. The faces depicted within the video frames may be detected. The detection of the faces depicted within the video frames may include determination of positions and sizes of the faces. A face detection rate may define a rate at which the faces are detected within the video frames. The face detection rate may be slower than the capture rate. A temporal filtering may be applied to determine the positions and the sizes of the faces within the video frames in which the detection of the faces has not been performed. A tracking filtering may be applied to determine the positions and the sizes of the faces within the video frames in which the detection of the faces has failed. The video frames may be blurred based on the positions and the sizes of the faces within the video frames and/or other information. One or more of the faces within the video frames may be blurred. The blurred video frames may be transmitted to one or more computing devices.

A housing may carry one or more components of an image capture device. The housing may carry (be attached to, support, hold, and/or otherwise carry) one or more of an electronic storage, an optical element, an image sensor, a processor, and/or other components.

The electronic storage may store information relating to the image capture device, information relating to components of the image capture device, visual information, information relating to visual content captured by the image capture device, information relating to video frames, information relating to depiction of faces in the visual content, information relating to face detection, information relating to temporal filtering, information relating to tracking filtering, information relating to video frame blurring, information relating to transmission of blurred video frames, and/or other information.

The optical element may be configured to guide light within a field of view to the image sensor. The field of view may be less than 180 degrees. The field of view may be equal to 180 degrees. The field of view may be greater than 180 degrees.

The image sensor may be configured to generate a visual output signal and/or other output signals based on light that becomes incident thereon and/or other information. The visual output signal may convey visual information and/or other information. The visual information may define visual content having the field of view.

The processor(s) may be configured by machine-readable instructions. Executing the machine-readable instructions may cause the processor(s) to facilitate blurring faces. The machine-readable instructions may include one or more computer program components. The computer program components may include one or more of a capture component, a face detection component, a temporal filtering component, a tracking filtering component, a blur component, a transmission component, and/or other computer program components.

The capture component may be configured to capture video frames. The video frames may be captured based on the visual content and/or other information. The video frames may depict faces. A capture rate may define a rate at which the video frames are captured.

The face detection component may be configured to detect the faces depicted within the video frames. The detection of the faces depicted within the video frames may include determination of positions and sizes of the faces. A face detection rate may define a rate at which the faces are detected within the video frames. The face detection rate may be slower than the capture rate.

In some implementations, a first face may be detected in a first video frame. The first face may have a first position and a first size in the first video frame. A second face may be detected in a second video frame. The second face may have a second position and a second size in the first video frame. The first face may be determined to be same as the second face based on a distance between the first position of the first face in the first video frame and the second position of the second face in the second video frame being less than a threshold distance and/or other information. The threshold distance may be determined based on the first size of the first face in the first video frame, the second size of the second face in the second video frame, and/or other information.

The temporal filtering component may be configured to apply a temporal filtering to the video frames. The temporal filtering may be applied to determine the positions and the sizes of the faces within the video frames in which the detection of the faces has not been performed.

In some implementations, the video frames may include a first video frame, a second video frame subsequent to the first video frame, and a third video frame subsequent to the second video frame. The detection of the faces may be performed on the first video frame and the third video frame. The detection of the faces may not be performed on the second video frame. The temporal filtering may determine a position of a given face in the second video frame based on a prior position of the given face in the first video frame, a subsequent position of the given face in the third video frame, and/or other information. The temporal filtering may determine a size of the given face in the second video frame based on a prior size of the given face in the first video frame, a subsequent size of the given face in the third video frame, and/or other information.

The tracking filtering component may be configured to apply a tracking filtering to the video frames. The tracking filtering may be applied to determine the positions and the sizes of the faces within the video frames in which the detection of the faces has failed.

In some implementations, the video frames may include a first video frame and a second video frame subsequent to the first video frame. The detection of the faces may be performed on the first video frame and the second video frame. The detection of the faces may fail in the second video frame. The tracking filtering may determine the position of a given face in the second video frame based on a prior position of the given face in the first video frame and/or other information. The tracking filtering may determine the size of the given face in the second video frame based on a prior size of the given face in the first video frame and/or other information.

The blur component may be configured to blur the video frames. The video frames may be blurred based on the positions and the sizes of the faces within the video frames and/or other information. One or more of the faces within the video frames may be blurred.

In some implementations, a target face may not be blurred in a given blurred video frame. In some implementations, a given face may be identified as the target face based on a given size of the given face and/or other information. In some implementations, a given face may be identified as the target face based on proximity of the given face to a bottom edge of the given blurred video frame and/or other information. In some implementations, a given face may be identified as the target face based on a user selection of the given face and/or other information.

The transmission component may be configured to transmit the blurred video frames to one or more computing devices. In some implementations, the transmission of the blurred video frames to a computing device may include live streaming of the blurred video frames to the computing device.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

FIG. 2 illustrates an example method for blurring faces captured within videos.

DETAILED DESCRIPTION

Figure 1:
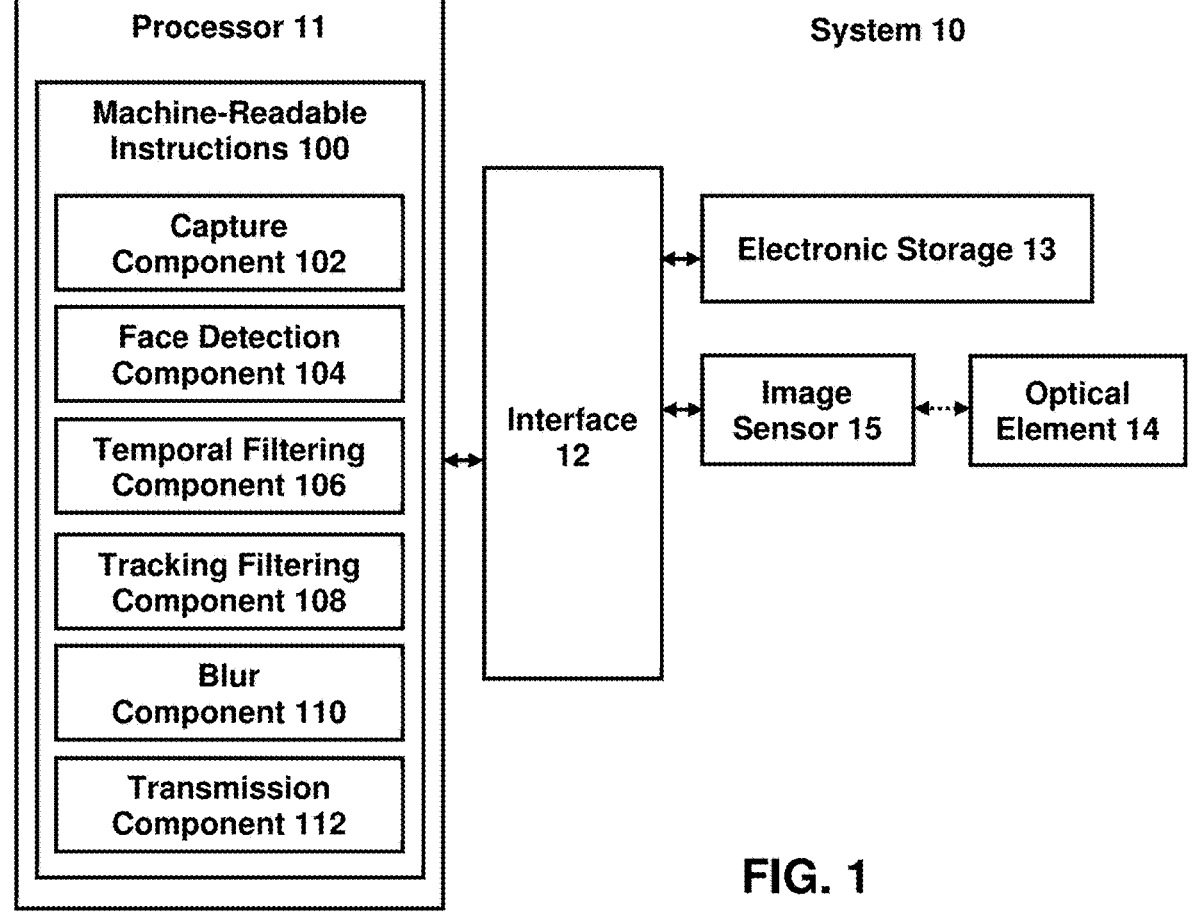
FIG. 1 illustrates an example system for blurring faces captured within videos.

FIG. 1 illustrates a system 10 for blurring faces captured within videos. The system 10 may include one or more of a processor 11, an interface 12 (e.g., bus, wireless interface), an electronic storage 13, an optical element 14, an image sensor 15, and/or other components. The system 10 may include and/or be part of an image capture device. The image capture device may include a housing, and one or more of the electronic storage 13, optical element 14, the image sensor 15, and/or other components of the system 10 may be carried by the housing of the image capture device. The optical element 14 may guide light within a field of view to the image sensor 15. The image sensor 15 may generate a visual output signal conveying visual information based on light that becomes incident thereon. The visual information may define visual content.

Video frames may be captured by the processor 11 based on the visual content and/or other information. The video frames may depict faces. A capture rate may define a rate at which the video frames are captured. The faces depicted within the video frames may be detected by the processor 11. The detection of the faces depicted within the video frames may include determination of positions and sizes of the faces. A face detection rate may define a rate at which the faces are detected within the video frames. The face detection rate may be slower than the capture rate. A temporal filtering may be applied by the processor 11 to determine the positions and the sizes of the faces within the video frames in which the detection of the faces has not been performed. A tracking filtering may be applied by the processor 11 to determine the positions and the sizes of the faces within the video frames in which the detection of the faces has failed. The video frames may be blurred by the processor 11 based on the positions and the sizes of the faces within the video frames and/or other information. One or more of the faces within the video frames may be blurred. The blurred video frames may be transmitted by the processor 11 to one or more computing devices.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store information relating to the image capture device, information relating to components of the image capture device, visual information, information relating to visual content captured by the image capture device, information relating to video frames, information relating to depiction of faces in the visual content, information relating to face detection, information relating to temporal filtering, information relating to tracking filtering, information relating to video frame blurring, information relating to transmission of blurred video frames, and/or other information. The electronic storage 13 may include non-transitory, machine-readable storage media. The non-transitory machine-readable storage media may include permanent memory and/or temporary memory. The electronic storage 13/the non-transitory, machine-readable storage media may store information defining content that has been captured by the image capture device.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content.

A video frame may include an image of the video content at a moment within the progress length of the video. As used herein, the term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video (s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files.

The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. For instance, the electronic storage 13, the optical element 14, and/or the image sensor 15 of the system 10 may be carried by the housing of the image capture device. The housing of the image capture device may carry other components of the system 10, such as the processor 11. References to a housing of an image capture device may refer to the image capture device, and vice versa.

An image capture device may refer to a device for capturing visual content. An image capture device may capture visual content in the form of images, videos, and/or other forms. An image capture device may refer to a device for recording visual information in the form of images, videos, and/or other media. An image capture device may capture other content, such as audio content using one or more sound sensors. An image capture device may capture metadata (e.g., position data, movement data) relating to the visual content and/or audio content. An image capture device may be a standalone device (e.g., camera, action camera, image sensor) or may be part of another device (e.g., part of a smartphone, tablet).

Figure 3:
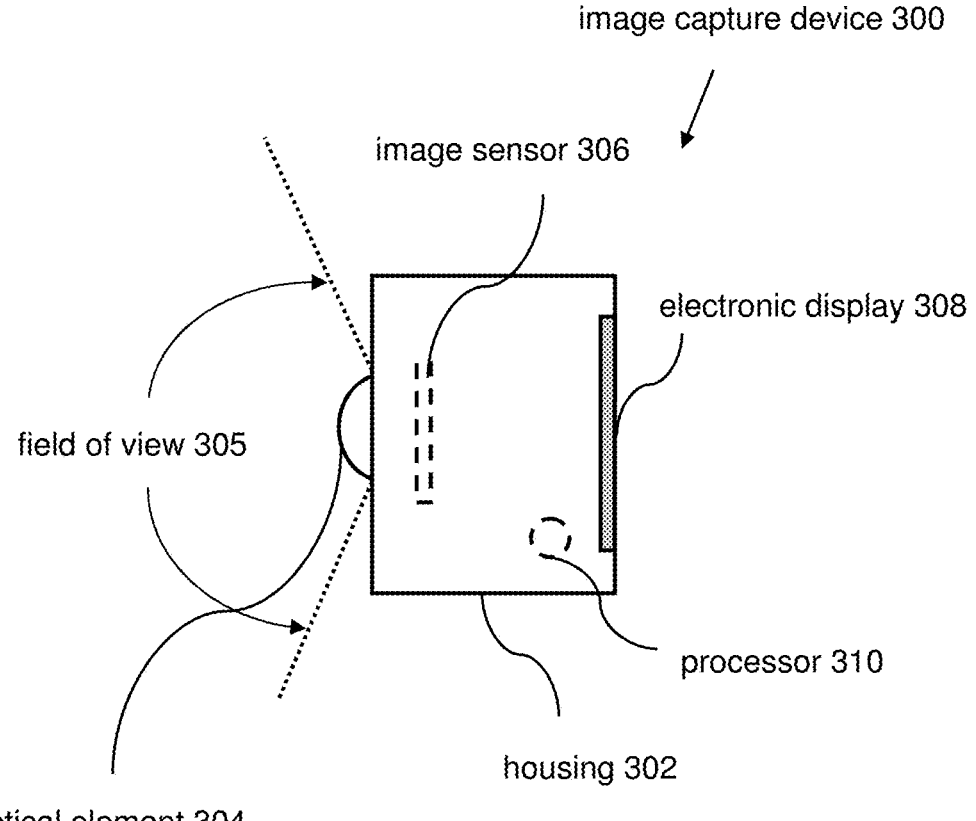
FIG. 3 illustrates an example image capture device.

FIG. 3 illustrates an example image capture device 300. Visual content (e.g., of image(s), video frame(s)), audio content, metadata relating to the visual content and/or audio content, and/or other content may be captured by the image capture device 300. The image capture device 300 may include a housing 302. The housing 302 may refer a device (e.g., casing, shell) that covers, protects, and/or supports one or more components of the image capture device 300. The housing 302 may include a single-piece housing or a multi-piece housing. The housing 302 may carry one or more components of the image capture device 300. The housing 302 may carry (be attached to, support, hold, and/or otherwise carry) one or more of an optical element 304, an image sensor 306, an electronic display 308, a processor 310, and/or other components.

One or more components of the image capture device 300 may be the same as, be similar to, and/or correspond to one or more components of the system 10. For example, the processor 310 may be the same as, be similar to, and/or correspond to the processor 11. The optical element 304 may be the same as, be similar to, and/or correspond to the optical element 14. The image sensor 306 may be the same as, be similar to, and/or correspond to the image sensor 15.

The image capture device 300 may include other components not shown in FIG. 3. The image capture device 300 may not include one or more components shown in FIG. 3. For example, the image capture device 300 may include one or more sound sensors. Other configurations of image capture devices are contemplated.

The optical element 304 may include instrument(s), tool(s), and/or medium that acts upon light passing through the instrument(s)/tool(s)/medium. For example, the optical element 304 may include one or more of lens, mirror, prism, and/or other optical elements. The optical element 304 may affect direction, deviation, and/or path of the light passing through the optical element 304. The optical element 304 may have a field of view 305. The optical element 304 may be configured to guide light within the field of view 305 to the image sensor 306.

The field of view 305 may include the field of view of a scene that is within the field of view of the optical element 304 and/or the field of view of the scene that is delivered to the image sensor 306. For example, the optical element 304 may guide light within its field of view to the image sensor 306 or may guide light within a portion of its field of view to the image sensor 306. The field of view of 305 of the optical element 304 may refer to the extent of the observable world that is seen through the optical element 304. The field of view 305 of the optical element 304 may include one or more angles (e.g., vertical angle, horizontal angle, diagonal angle) at which light is received and passed on by the optical element 304 to the image sensor 306. In some implementations, the field of view 305 may be greater than 180-degrees. In some implementations, the field of view 305 may be less than 180-degrees. In some implementations, the field of view 305 may be equal to 180-degrees.

In some implementations, the image capture device 300 may include multiple optical elements. For example, the image capture device 300 may include multiple optical elements that are arranged on the housing 302 to capture spherical images/videos (guide light within spherical field of view to one or more images sensors). For instance, the image capture device 300 may include two optical elements positioned on opposing sides of the housing 302. The fields of views of the optical elements may overlap and enable capture of spherical images and/or spherical videos.

The image sensor 306 may include sensor(s) that converts received light into output signals. The output signals may include electrical signals. The image sensor 306 may generate output signals conveying information that defines visual content of one or more images and/or one or more video frames of a video. For example, the image sensor 306 may include one or more of a charge-coupled device sensor, an active pixel sensor, a complementary metal-oxide semiconductor sensor, an N-type metal-oxide-semiconductor sensor, and/or other image sensors.

The image sensor 306 may be configured to generate output signals conveying information that defines visual content of one or more images and/or one or more video frames of a video. The image sensor 306 may be configured to generate a visual output signal based on light that becomes incident thereon during a capture duration and/or other information. The visual output signal may convey visual information that defines visual content having the field of view. The optical element 304 may be configured to guide light within the field of view 305 to the image sensor 306, and the image sensor 306 may be configured to generate visual output signals conveying visual information based on light that becomes incident thereon via the optical element 304.

The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

Capture of visual content by the image sensor 306 may include conversion of light received by the image sensor 306 into output signals/visual information defining visual content. Capturing visual content may include recording, storing, and/or otherwise capturing the visual content for use in generating video content (e.g., content of video frames). For example, during a capture duration, the visual output signal generated by the image sensor 306 and/or the visual information conveyed by the visual output signal may be used to record, store, and/or otherwise capture the visual content for use in generating video content.

In some implementations, the image capture device 300 may include multiple image sensors. For example, the image capture device 300 may include multiple image sensors carried by the housing 302 to capture spherical images/videos based on light guided thereto by multiple optical elements. For instance, the image capture device 300 may include two image sensors configured to receive light from two optical elements positioned on opposing sides of the housing 302. The fields of views of the optical elements may overlap and enable capture of spherical images and/or spherical videos.

The image capture device 300 may include other sensors. For example, the image capture device 300 may include one or more sound sensors to capture audio content. A sound sensor may include sensor(s) (e.g., microphone, component(s) of microphone) that converts received sounds into output signals. The output signals may include electrical signals. The sound sensor may generate output signals conveying information based on sounds received by the sound sensor. For example, the sound sensor may be configured to generate an audio output signal conveying audio information based on the sounds received by the sound sensor. The audio information may define audio content. The audio information may define audio content by including information that defines one or more content, qualities, attributes, features, and/or other aspects of the audio content. For example, the audio information may define audio content by including information that makes up the content of the audio, and/or information that is used to determine the content of the audio. The audio content may include one or more reproductions of the received sounds. The audio information may define audio content in one or more formats, such as WAV, MP3, MP4, RAW, and/or other formats.

The image capture device 300 may include one or more location sensors (e.g., GPS sensors) to measure location of the image capture device and/or one or more position sensors (e.g., gyroscope, accelerometer, inertial measurement unit) to measure position, movement, and/or orientation of the image capture device. In some implementations, information about location, position, and/or movement of the image capture device may be stored as metadata of other content (e.g., visual content, audio content) captured by the image capture device.

The electronic display 308 may include an electronic device that provides visual presentation of information. The electronic display 308 may include a color display and/or a non-color display. The electronic display 308 may be configured to visually present information. The image capture device 300 may include multiple electronic displays.

The electronic display 308 may include one or more touchscreen displays. A touchscreen display may include one or more touch-sensitive screens and/or other components. A user may engage with the electronic display 308 by touching one or more portions of a touch-sensitive screen (e.g., with one or more fingers, stylus). A user may engage with the electronic display 308 at a moment in time, at multiple moments in time, during a period, and/or during multiple periods. For example, a user may tap on, hold, or move along the electronic display 308 to provide input to the image capture device. For example, a user may tap on and/or hold a finger on a portion of the electronic display 308 corresponding to a virtual button to provide input to the image capture device.

The electronic display 308 may be configured to present visual content, graphical user interface, and/or other information. A graphical user interface may include a graphical form that enables a user to interact with the image capture device 300 and/or see information provided by the image capture device 300. A graphical user interface may include one or more interface elements. The interface element(s) may enable presentation of information to the user and/or reception of user input to control the image capture device 300.

A processor may include one or more processors (logic circuitry) that provide information processing capabilities in the image capture device. The processor may provide one or more computing functions for the image capture device. The processor may operate/send command signals to one or more components of the image capture device to operate the image capture device. For example, referring to FIG. 3, the processor 310 may facilitate operation of the image capture device 300 in capturing image(s) and/or video(s), facilitate operation of the optical element 304 (e.g., change how light is guided by the optical element 304), and/or facilitate operation of the image sensor 306 (e.g., change how the received light is converted into information that defines images/videos and/or how the images/videos are post-processed after capture).

The processor 310 may obtain information from the image sensor 306 and/or facilitate transfer of information from the image sensor 306 to another device/component.

The processor 310 may obtain information from other sensor(s) and/or facilitate transfer of information from other sensor(s) to another device/component. The processor 310 may be remote from the processor 11 or local to the processor 11. One or more portions of the processor 310 may be remote from the processor 11 and/or one or more portions of the processor 10 may be part of the processor 310. The processor 310 may include and/or perform one or more functionalities of the processor 11 shown in FIG. 1.

An image capture device may be used to capture a video that depicts people. The user of the image capture device may wish to blur one or more faces depicted in the video. For example, a vlogger may capture a video of a scene including multiple people and may wish to blur the faces of everyone besides the vlogger before streaming the video.

The present disclosure provides a light-weight, fast, and efficient tool for blurring faces within videos. The blurring technique described herein may be used in real-time to blur faces captured within a video during capture and enable streaming of the blurred video. Video frames may be captured at a capture rate, and face detection may be performed to determine the positions and sizes of faces within video frames. Face detection may be performed at a slower rate than the capture rate. Temporal filtering may be applied to determine the positions and sizes of the faces within the video frames in which face detection has not been performed. Tracking filtering may be applied to determine the positions and sizes of the faces within the video frames in which face detection has failed. One or more of the faces within the video frames may be blurred, and the blurred video frames may be transmitted to one or more computing devices.

Referring back to FIG. 1, the processor 11 (or one or more components of the processor 11) may be configured to obtain information to facilitate blurring faces captured within videos. Obtaining information may include one or more of accessing, acquiring, analyzing, determining, examining, identifying, loading, locating, opening, receiving, retrieving, reviewing, selecting, storing, and/or otherwise obtaining the information. The processor 11 may obtain information from one or more locations. For example, the processor 11 may obtain information from a storage location, such as the electronic storage 13, electronic storage of information and/or signals generated by one or more sensors, electronic storage of a device accessible via a network, and/or other locations. The processor 11 may obtain information from one or more hardware components (e.g., an image sensor, an electronic display, a touchscreen display) and/or one or more software components (e.g., software running on a computing device).

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate blurring faces captured within videos. The machine-readable instructions 100 may include one or more computer program components. The machine-readable instructions 100 may include one or more of a capture component 102, a face detection component 104, a temporal filtering component 106, a tracking filtering component 108, a blur component 110, a transmission component 112, and/or other computer program components.

The capture component 102 may be configured to capture video frames. The video frames may be captured using an image capture device. The video frames may be captured manually and/or automatically. Manual capture of video frames may include capture of video frames based on user input to capture video frames. For example, the video frames may be captured based on user interaction with the image capture device/a computing device connected/paired with the image capture device to start recording a video. Automatic capture of video frames may include capture of video frames based on occurrence of one or more conditions. For example, the image capture device may be configured to start recording a video based on detection of an object, passage of time, and/or location of the image capture device.

Capturing video frames may include generating, recording, storing, using, and/or otherwise capturing the video frames. The video frames may be captured during a capture duration. The captured video frames may be used to generate one or more videos. The video frames may be captured based on the visual content and/or other information. The video frames may be generated based on the visual content captured by the image sensor 15. For example, the capture component 102 may use the visual output signal generated by the image sensor 15 and/or the visual information conveyed by the visual output signal to generate, record, store, use, and/or otherwise capture the video frames content.

A capture rate may define a rate at which the video frames are captured by the image capture device. A capture rate may define a rate at which the video frames are generated based on visual content captured by the image sensor 15. The value of the capture rate may define the rate at which the video frames are captured. For example, the value of the capture rate may define how many video frames are captured per a duration of time (e.g., number of video frames per second).

The video frames may depict faces. The video frame may include depiction of faces. Some or all of the video frames may depict faces. The video frames may depict a single face or multiple faces at the same time. For example, a single video frame may depict a single face or multiple faces. A face may refer to the front part of a person's head. The video frames may depict the entirety of a face or one or more parts of a face.

The face detection component 104 may be configured to detect the faces depicted within the video frames. Detecting a face depicted within a video frame may include one or more of ascertaining, determining, discerning, discovering, finding, identifying, spotting, and/or otherwise detecting the face depicted within the video frame. A face depicted within a video frame may be detected based on analysis of the video frame and/or other information. Analysis of a video frame may include examination, evaluation, processing, studying, and/or other analysis of the video frame. For example, analysis of a video frame may include examination, evaluation, processing, studying, and/or other analysis of one or more visual features/characteristics of the video frame. For example, visual features and/or visual characteristics of a video frame may be analyzed to determine whether a face is depicted within the video frame. The face detection component 104 may utilize computer vision/machine-learning, object/pattern recognition, object/pattern tracking, and/or other visual analysis to detect a face depicted within a video frame.

The detection of the faces depicted within the video frames (face detection) may include determination of positions and sizes of the faces depicted within the video frames. The position of a face within a video frame may refer to the location of the face within the video frame. For example, the center position of a face (e.g., center pixel location of a bounding box for the face) and/or a corner position of a face (e.g., top, left corner pixel location of a bounding box for the face) may be determined. The size of a face within a video frame may refer to the amount of space (e.g., in terms of pixels, in terms of angles) that is taken up by the face. For example, the height and width of the face (e.g., the pixel height and pixel width of the bounding box for the face) may be determined. In some implementations, the detection of the faces depicted within the video frames may include determination of rotations (tilt) of the faces depicted within the video frames.

Individual faces that are detected within the video frames may have/be associated with an identifier, a confidence score, and/or other information. The same identifier may be assigned to the face of the same person detected within different video frames. Faces in different video frames that are determined to depict the face of the same person may be associated with the same identifier. The confidence score may indicate the confidence of the face detection. The confidence score may indicate the probability that the face has been accurately detected within the video frame.

In some implementations, a face that is detected within a video frame may be removed as not actually depicting a face. For example, one or more thresholds may be used to remove detected faces. For instance, a face that is detected with a confidence score lower than a threshold may be treated as not actually depicting a face. As another example, one or more colors of detected faces may be used to remove the detected faces. For instance, the main color of a detected face be compared to one or more skin colors. A face with a main color that is different from the skin color(s) by more than a threshold amount may be treated as not actually depicting a face.

A face detection rate may define a rate at which the faces are detected within the video frames. A face detection rate may determine in which of the video frames the face detection is performed and in which of the video frames the face detection is not performed. The value of the face detection rate may define the number of the video frame in which the face detection is performed. The face detection may be performed in some or all of the video frames. For example, the video frames may be captured at a high rate and performing face detection on all of the video frames may not be feasible due to limited resources (e.g., limitations on time and/or processing power).

The face detection rate may be slower than the capture rate. The value of the face detection rate may be lower than the value of the capture rate. For example, the video frames may be captured at 30 frames per second, while the face detection may be performed at 10 frames per second. The face detection may be performed in one out of three video frames and not performed in two out of three video frames. Information on the positions and sizes of faces within two out of three video frames may be missing. Other differences in capture rate and face detection rate are contemplated.

In some implementations, different identifiers may be assigned to the face of the same person detected within different video frames. For example, the face of the same person may be depicted across multiple video frames, but the face in different video frames may have different identifiers. For instance, the face detection may fail to determine that the faces in the different video frames are of the same person. Faces that have different identifiers in the different video frames may be determined to belong to the same person based on the distance between the positions of the faces in the different video frames, differences between the sizes of the faces in the different video frames, and/or other information.

For example, a first face may be detected in a first video frame. The first face may have a first position and a first size in the first video frame. A second face may be detected in a second video frame. The second video frames may be the previous or the subsequent video frame in which face detection has been performed. The second face may have a second position and a second size in the first video frame. The first face in the first video frame may be determined to be same (depict the face of the same person) as the second face in the second video frame based on a distance between the first position of the first face in the first video frame and the second position of the second face in the second video frame being less than a threshold distance and/or other information. The distance between the two faces may include the distance between the centers of the two faces. The distance between the two faces may include the distance between the edges of the two faces. In some implementations, the faces may be required to have a difference in size that is less than a threshold size for the faces in the different video frames to be determined to be the same face.

The threshold distance may be determined based on the first size of the first face in the first video frame, the second size of the second face in the second video frame, and/or other information. For example, the threshold distance ($\tau$) may be calculated using the below, where $w_1$ is the width of the first face, $w_2$ is the width of the second face, $h_1$ is the height of the first face, $h_2$ is the height of the second face, and $\alpha$ is a tuning parameter (e.g., with default value of 1.5). The threshold distance may be in the general order of the size of the faces. Use of other threshold distance is contemplated.

$$\tau = \alpha * \sqrt{\max(w_1, w_2)^2 + \max(h_1, h_2)^2}$$

Faces may not be detected in all video frames. Faces may not be detected in video frames in which face detection is not performed. Faces may not be detected in video frames in which face detection has failed (e.g., face detection failed to identify a face in a video frame due to limitations of the face detection algorithm, noise, etc.). Filtering may be applied to the video frames in which faces have not been detected. Filtering may be applied to determine the positions and the sizes of the faces in the video frames in which faces have not been detected.

In some implementations, detection of a particular face may be stopped based on proximity of the face to the edge of the video frame. For example, a face may have been close to the border of the last video frame (e.g., within a threshold distance of the edge of the video frame) in which it was detected. Based on the face being close to the border of the video frame before it was lost, filtering may not be applied to determine the positions and sizes of the faces in subsequent video frames. For example, based on the face being close to the border of the video frame before it was lost, the face may be deemed to have moved out of view of the image capture device. Loss of the face may be deemed to have happened due to the person no longer being within the field of view of the image capture device, rather than due to face detection not being performed or failure of face detection.

The temporal filtering component 106 may be configured to apply a temporal filtering and/or other filtering to the video frames. Applying the temporal filtering to the video frames may include directing, employing, targeting, using, and/or otherwise applying the temporal filtering to the video frames. The temporal filtering may be applied to determine the positions and the sizes of the faces within the video frames in which the detection of the faces has not been performed. The temporal filtering may be applied to determine the positions and the sizes of the faces within the video frames in which face detection has not been performed.

The temporal filtering may refer to a process of determining the positions and sizes of faces using the positions and sizes of faces determined in previous and subsequent video frames. The temporal filtering may refer to a process of interpolating the positions and sizes of faces using the positions and sizes of faces determined in the previous and subsequent video frames. For example, linear interpolation may be used to determine the intermediate positions of a face based on the prior and subsequent positions of the face and to determine the intermediate sizes of a face based on the prior and subsequent sizes of the face. Linear interpolation may be used to determine the intermediate rotations of a face based on the prior and subsequent rotations of the face.

For example, the video frames may include a first video frame, a second video frame subsequent to the first video frame, and a third video frame subsequent to the second video frame. The detection of the faces may be performed on the first video frame and the third video frame. The detection of the faces may not be performed on the second video frame. The temporal filtering may determine a position of a given face in the second video frame based on a prior position of the given face in the first video frame, a subsequent position of the given face in the third video frame, and/or other information. The temporal filtering may determine a size of the given face in the second video frame based on a prior size of the given face in the first video frame, a subsequent size of the given face in the third video frame, and/or other information. The impact of the prior and subsequent positions and sizes of the face in the second video frame may be set based on the relative temporal position of the second video frame with respect to the first video frame and the third video frame.

Figure 4:
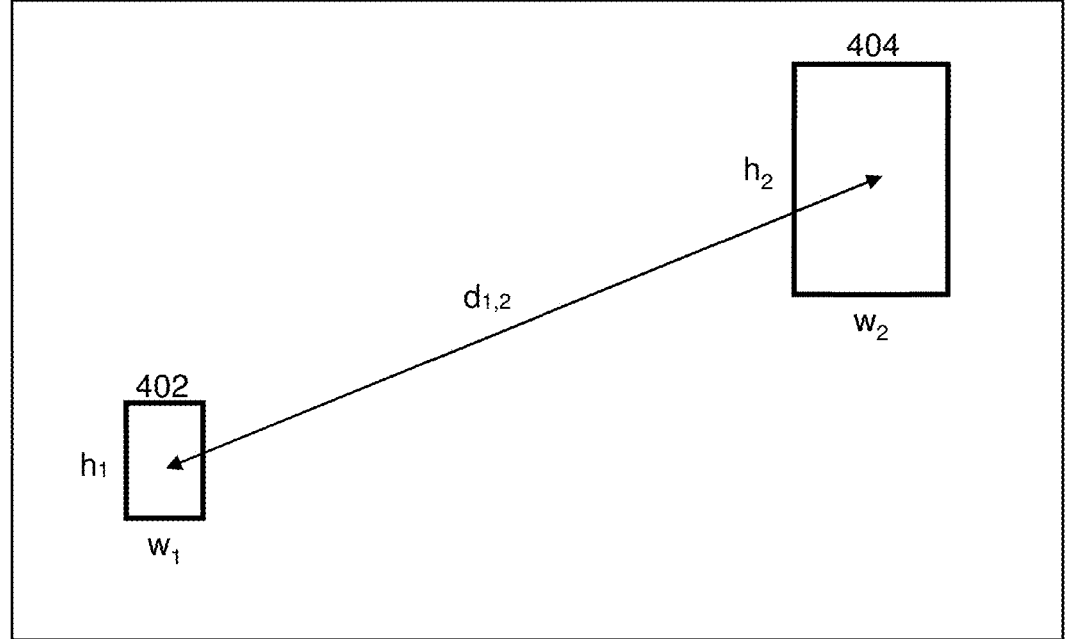
FIG. 4 illustrates example positions and sizes of faces within a video.

FIG. 4 illustrates example positions and sizes of faces within a video. FIG. 4 shows the positions and sizes of a face 402 depicted within a previous video frame (the last video frame in which face detection is performed), and the positions and sizes of a face 404 depicted within a subsequent video frame (the next video frame in which face detection is performed). The face 402 and the face 404 may be the same face. The face 402 and the face 404 may include depiction of the face of the same person.

One or more video frames may have been captured between the previous and subsequent video frames. The positions and the size of the faces 402, 404 in the previous and subsequent video frames may be tracked to determine the positions and the sizes of the face in intermediate video frame(s). Linear interpolation may be used to determine the positions and the sizes of the face in the intermediate video frame(s). Linear interpolation may set the positions and the sizes of the face based on the relative position of the intermediate video frames to the previous and subsequent video frames. Linear interpolation may change the positions and the sizes of the face to change from the position and the size of the face 402 to the position and the size of the face 404.

Figure 5:
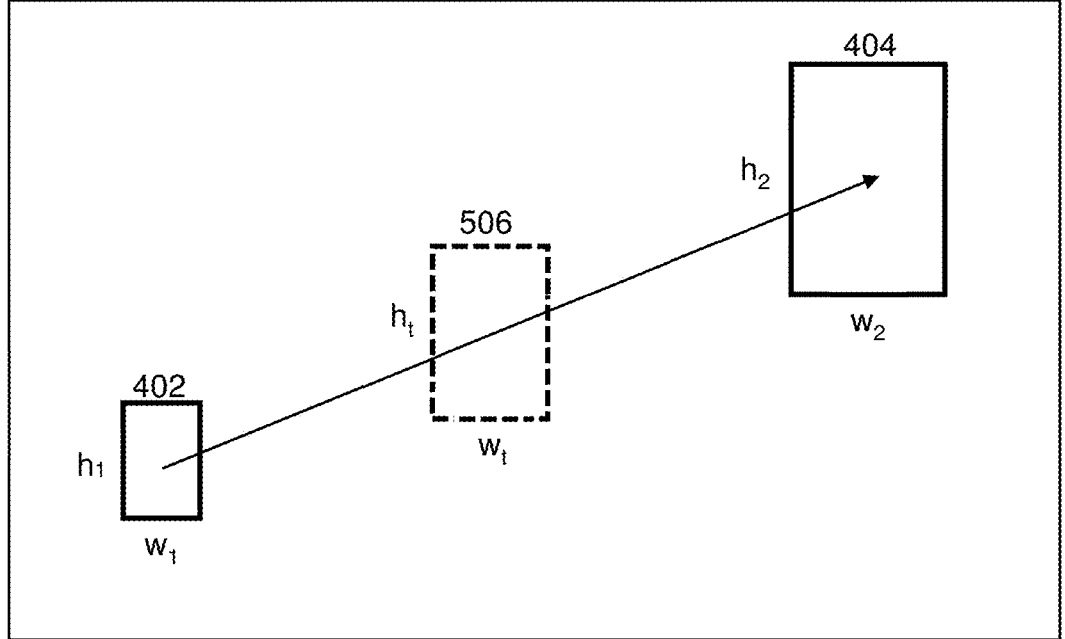
FIG. 5 illustrates example positions and sizes of faces within a video.

For example, in FIG. 5, the position and the size of the face 506 in a video frame that was captured midway between the capture of the previous and subsequent video frames may be determined. The position and the size of the face 506 may be determined to be halfway between the positions and the size of the faces 402, 404. Other determination/interpolation of the positions and sizes of the faces are contemplated.

The tracking filtering component 108 may be configured to apply a tracking filtering and/or other filtering to the video frames. Applying the tracking filtering to the video frames may include directing, employing, targeting, using, and/or otherwise applying the tracking filtering to the video frames. The tracking filtering may be applied to determine the positions and the sizes of the faces within the video frames in which the detection of the faces has failed. The tracking filtering may be applied to determine the positions and the sizes of the faces within the video frames in which face detection has failed.

The tracking filtering may refer to a process of determining the positions and sizes of faces using the positions and sizes of faces determined in a previous video frame. The tracking filtering may refer to a process of fixing the positions and sizes of faces using the positions and sizes of faces determined in the previous video frame. When a face is lost due to failure of face detection, the tracking filtering may assume that the face has remained in the same position/with the same size in the video. The lost face may be searched for in the next video frame in which face detection is performed. If the lost face is not detected again the in next video frame, filtering may not be applied to determine the positions and sizes of the faces in subsequent video frames.

For example, the video frames may include a first video frame and a second video frame subsequent to the first video frame. The detection of the faces may be performed on the first video frame and the second video frame. The detection of the faces may fail in the second video frame. The tracking filtering may determine the position of a given face in the second video frame based on the prior position of the given face in the first video frame and/or other information. The tracking filtering may determine the size of the given face in the second video frame based on the prior size of the given face in the first video frame and/or other information. The position and the size of the given face in the second video frame may be set to be same as the position and the size of the given face in the first video frame.

Figure 6:
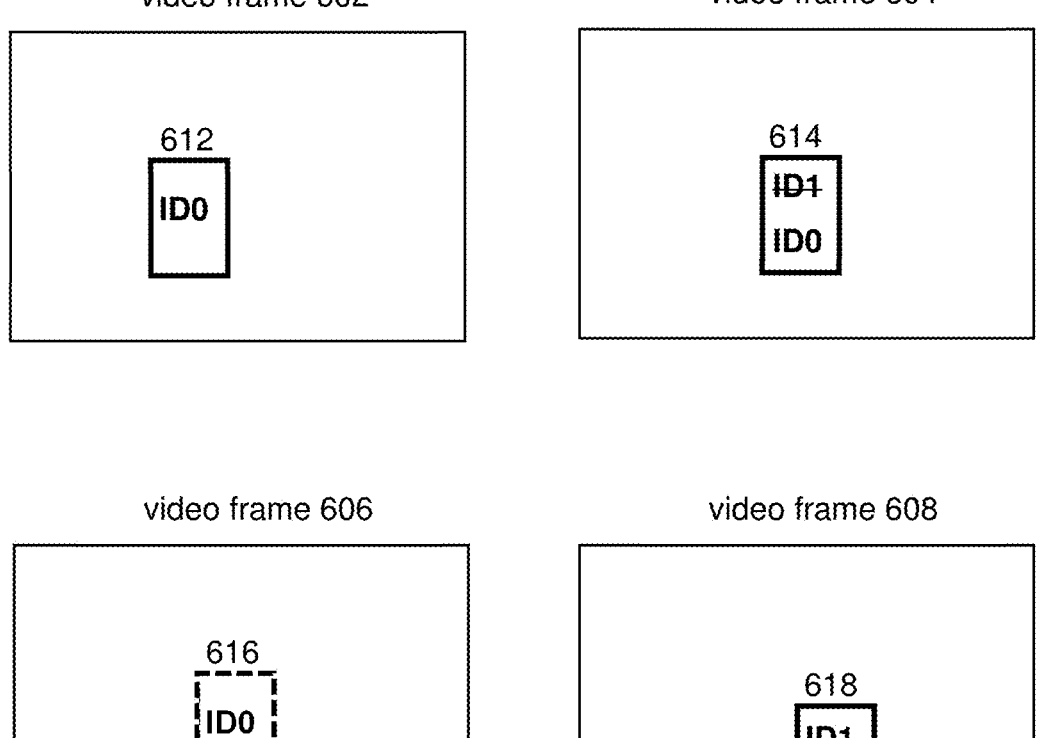
FIG. 6 illustrates example positions and sizes of faces within a video.

FIG. 6 illustrates example positions and sizes of faces within a video. Face detection may be performed in video frames 602, 604, 606, 608 of the video. Face detection may be performed in the video frames 602, 604, 606, 608. In the video frame 602, the position and size of a face 612 with identifier ID0 may be determined. In the video frame 604, the position and size of a face 614 with identifier ID1 may be determined. Based on proximity of the positions of the face 612 and the face 614 (e.g., the distance between the positions of the face 612 and the face 614 being less than a threshold distance), the face 612 and the face 614 may be determined to be the same face. The identifier of the face 614 may be changed to be the same as the identifier of the face 612.

In the video frame 606, the face detection may have failed to detect the face with identifier ID0. No other faces may be detected within the video frame 606. No other faces may be detected near the prior position of the face with identifier ID0. Tracking filtering may fix (force) the position and the size of a face 616 with identifier ID0 in the video frame 606 using the position and the size of the face 614 with identifier ID0 in the prior video frame (the video frame 604).

In the video frame 608, the position and size of a face 618 with identifier ID1 may be determined. Based on proximity of the position of the face 618 and the fixed (forced) position of the face 616 (e.g., the distance between the positions of the face 616 and the face 618 being less than a threshold distance), the face 616 and the face 618 may be determined to be the same face. The identifier of the face 618 may be changed to be the same as the identifier of the face 616.

The blur component 110 may be configured to blur the video frames. Blurring a video frame may include making one or more parts of the video frame less distinct. Blurring a video frame may include making one or more parts of the video frame less sharp. Blurring a video frame may include reducing the level of detail within one or more parts of the video frame. Blurring a video frame may include changing the depiction of objects in the video frame. Example techniques for blurring a video frame include pixelization, alpha blending, gaussian blending, and placing another depiction (e.g., emoji, icon, graphic) over the face. Other types of blurring are contemplated.

The video frames may be blurred based on the positions and the sizes of the faces within the video frames and/or other information. The positions and the sizes of the faces within the video frames may be used to determine which parts of the video frames are blurred. A part of the video frame that depicts a face (e.g., a part of the video frame that includes a bounding box for the face) may be blurred. In some implementations, one or more masks may be generated based on the positions and the sizes of the faces within the video frames. The mask(s) may be applied to the video frames to target the faces for blurring.

Blurring may be applied to a greater part of the video frame than the part of the video frame that depicts the face. For example, the face detection may not provide accurate determination of the position and/or the size of the face. To account for possible error in face detection, the size of the area to which blurring is applied may be made greater than the area of the video frame in which the face is detected (e.g., set the region of interest/generating the blending box for blurring by increasing the bounding box for the face by a certain percentage, such as 15%). The size of the area to which blurring is applied may be made a multiple of 32 pixels, which may make the area hardware friendly for vectorization of the computation for blurring. In some implementations, the size of the face detected in the video frame may be increased to account for possible error in face detection, and the blurring may be applied to the part of the video frame that includes the increased face size. In some implementations, a smooth transition may be applied to the edges of the area to which blurring is applied to create a transition between blurred and unblurred parts of the video frames. In some implementation, the blurring may be applied to one or more channels of the video frames. For example, the video frames may be stored in a YUV format, and the blurring may be applied to the luma (Y) channel. Use of other channels is contemplated.

One or more of the faces within the video frames may be blurred. For example, some of the faces within the video frames may be blurred while some of the faces within the video frames may not be blurred. For example, a target face may not be blurred in the video (one or more blurred video frames) while other face(s) may be blurred in the video. A target face may refer to a face that is not to be blurred. A target face may refer to a face whose depiction is not to be hidden in the video. In some implementations, a single target face may be identified within a video. In some implementations, multiple target faces may be identified within a video.

In some implementations, a face may be identified as a target face based on the size of the face and/or other information. For example, the largest face depicted within a video frame may be identified as a target face. The person closest to the image capture device may have the largest face in the video. A person holding the image capture device with the image capture device pointed in the direction of the person may have the largest face in the video. Such identification of the target face may result in the largest face not being blurred in the video and smaller face(s) being blurred in the video.

In some implementations, a face may be identified as a target face based on proximity of the face to the bottom edge of the video/video frames and/or other information. For example, the face that is closest to the bottom edge of the video/video frames may be identified as a target face. A person holding the image capture device with the image capture device pointed in the direction of the person may be located nearest to the bottom edge of the video/video frames. Such identification of the target face may result in the face closest to the bottom edge not being blurred in the video and other face(s) being blurred in the video.

In some implementations, both the size and the position of the faces may be used to identify a target face. For example, the face that is largest in size and closest to the bottom edge of the video/video frames may be identified as a target face.

In some implementations, a face may be identified as a target face based on a user selection of the face and/or other information. For example, a user may designate one or more of the faces in the video as target face(s). User selection of the face(s) may be received directly by the image capture device (e.g., based on user interaction with one or more buttons or touchscreen display of the image capture device) or indirectly through another computing device (e.g., a mobile device connected to the image capture device).

The transmission component 112 may be configured to transmit the blurred video frames to one or more computing devices. Transmitting a blurred video frame to a computing device may include making available, providing, sending, and/or otherwise transmitting the blurred video frame to the computing device. Some or all of the blurred video frames may be transmitted to a computing device. The transmission component 112 may be configured to transmit a video frame to a computing device over one or more communication networks.

In some implementations, the transmission of the blurred video frames to a computing device may include live streaming of the blurred video frames to the computing device. The computing device may receive the blurred video frames for playback on the computing device. Playback of the blurred video frames may include blurred depiction of one or more faces in the video.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

While the implementations of the disclosure are described with respect to the system 10, this is merely as an example and is not meant to be limiting. In some implementation, some or all of the functionalities attributed herein to the system 10 may be performed by another system, one or more computing devices, and/or one or more processing apparatuses (e.g., tangible hardware/equipment that processes information). In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11, the electronic storage 13, and the image sensor 15 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

FIG. 2 illustrates method 200 for blurring faces captured within videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, an image capture device may include a housing. The housing may carry one or more of an optical element, an image sensor, and/or other components. The optical element may guide light within a field of view to the image sensor. The image sensor may generate a visual output signal conveying visual information based on light that becomes incident thereon. The visual information may define visual content.

At operation 201, video frames may be captured based on the visual content and/or other information. The video frames may depict faces. A capture rate may define a rate at which the video frames are captured. In some implementations, operation 201 may be performed by a processor component the same as or similar to the capture component 102 (Shown in FIG. 1 and described herein).

At operation 202, the faces depicted within the video frames may be detected. The detection of the faces depicted within the video frames may include determination of positions and sizes of the faces. A face detection rate may define a rate at which the faces are detected within the video frames. The face detection rate may be slower than the capture rate. In some implementations, operation 202 may be performed by a processor component the same as or similar to the face detection component 104 (Shown in FIG. 1 and described herein).

At operation 203, a temporal filtering may be applied to determine the positions and the sizes of the faces within the video frames in which the detection of the faces has not been performed. In some implementations, operation 203 may be performed by a processor component the same as or similar to the temporal filtering component 106 (Shown in FIG. 1 and described herein).

At operation 204, a tracking filtering may be applied to determine the positions and the sizes of the faces within the video frames in which the detection of the faces has failed. In some implementations, operation 204 may be performed by a processor component the same as or similar to the tracking filtering component 108 (Shown in FIG. 1 and described herein).

At operation 205, the video frames may be blurred based on the positions and the sizes of the faces within the video frames and/or other information. One or more of the faces within the video frames may be blurred. In some implementations, operation 205 may be performed by a processor component the same as or similar to the blur component 110 (Shown in FIG. 1 and described herein).

At operation 206, the blurred video frames may be transmitted to one or more computing devices. In some implementations, operation 206 may be performed by a processor component the same as or similar to the transmission component 112 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. An image capture device comprising:
a housing;
an image sensor carried by the housing and configured to generate a visual output signal conveying visual information based on light that becomes incident thereon, the visual information defining visual content;
an optical element carried by the housing and configured to guide light within a field of view to the image sensor; and
one or more physical processors carried by the housing, the one or more physical processors configured by machine-readable instructions to:
    capture video frames based on the visual content, the video frames depicting faces, wherein a capture rate defines a rate at which the video frames are captured;
    detect the faces depicted within the video frames, the detection of the faces depicted within the video frames including determination of positions and sizes of the faces, wherein a face detection rate defines a rate at which the faces are detected within the video frames, the face detection rate slower than the capture rate;
    apply a temporal filtering to determine the positions and the sizes of the faces within the video frames in which the detection of the faces has not been performed;
    apply a tracking filtering to determine the positions and the sizes of the faces within the video frames in which the detection of the faces has failed;
    blur the video frames based on the positions and the sizes of the faces within the video frames, wherein one or more of the faces within the video frames are blurred; and
    transmit the blurred video frames to a computing device;
wherein:
    the video frames include a first video frame, a second video frame subsequent to the first video frame, and a third video frame subsequent to the second video frame;
    the detection of the faces is performed on the first video frame and the third video frame;
    the detection of the faces is not performed on the second video frame;
    the temporal filtering determines a position of a given face in the second video frame based on a prior position of the given face in the first video frame and a subsequent position of the given face in the third video frame;
    the temporal filtering determines a size of the given face in the second video frame based on a prior size of the given face in the first video frame and a subsequent size of the given face in the third video frame;
    the video frames includes a fourth video frame and a fifth video frame subsequent to the fourth video frame;
    the detection of the faces is performed on the fourth video frame and the fifth video frame, wherein the detection of the faces fails in the fifth video frame;
    the tracking filtering determines a position of a particular face in the fifth video frame based on a prior position of the particular face in the fourth video frame; and
the tracking filtering determines a size of the particular face in the fifth video frame based on a prior size of the particular face in the fourth video frame,
wherein:
a first face is detected in a first video frame, the first face having a first position and a first size in the first video frame;
a second face is detected in a second video frame, the second face having a second position and a second size in the second video frame; and
the first face is determined to be the same as the second face based on a distance between the first position of the first face in the first video frame and the second position of the second face in the second video frame being less than a threshold distance; and
the threshold distance is determined based on the first size of the first face in the first video frame and the second size of the second face in the second video frame.

2. An image capture device comprising:

a housing;

an image sensor carried by the housing and configured to generate a visual output signal conveying visual information based on light that becomes incident thereon, the visual information defining visual content;

an optical element carried by the housing and configured to guide light within a field of view to the image sensor; and one or more physical processors carried by the housing, the one or more physical processors configured by machine-readable instructions to:

capture video frames based on the visual content, the video frames depicting faces, wherein a capture rate defines a rate at which the video frames are captured;

detect the faces depicted within the video frames, the detection of the faces depicted within the video frames including determination of positions and sizes of the faces, wherein a face detection rate defines a rate at which the faces are detected within the video frames, the face detection rate slower than the capture rate;

apply a temporal filtering to determine the positions and the sizes of the faces within the video frames in which the detection of the faces has not been performed;

apply a tracking filtering to determine the positions and the sizes of the faces within the video frames in which the detection of the faces has failed;

blur the video frames based on the positions and the sizes of the faces within the video frames, wherein one or more of the faces within the video frames are blurred; and transmit the blurred video frames to a computing device, wherein:

a first face is detected in a first video frame, the first face having a first position and a first size in the first video frame;

a second face is detected in a second video frame, the second face having a second position and a second size in the second video frame; and the first face is determined to be the same as the second face based on a distance between the first position of the first face in the first video frame and the second position of the second face in the second video frame being less than a threshold distance; and the threshold distance is determined based on the first size of the first face in the first video frame and the second size of the second face in the second video frame.

3. The image capture device of claim 2, wherein:

the video frames include a first video frame, a second video frame subsequent to the first video frame, and a third video frame subsequent to the second video frame;

the detection of the faces is performed on the first video frame and the third video frame;

the detection of the faces is not performed on the second video frame;

the temporal filtering determines a position of a given face in the second video frame based on a prior position of the given face in the first video frame and a subsequent position of the given face in the third video frame; and the temporal filtering determines a size of the given face in the second video frame based on a prior size of the given face in the first video frame and a subsequent size of the given face in the third video frame.

4. The image capture device of claim 2, wherein:

the video frames include a first video frame and a second video frame subsequent to the first video frame;

the detection of the faces is performed on the first video frame and the second video frame, wherein the detection of the faces fails in the second video frame;

the tracking filtering determines a position of a given face in the second video frame based on a prior position of the given face in the first video frame; and the tracking filtering determines a size of the given face in the second video frame based on a prior size of the given face in the first video frame.

5. The image capture device of claim 2, wherein a target face is not blurred in a given blurred video frame.

6. The image capture device of claim 5, wherein a given face is identified as the target face based on a given size of the given face.

7. The image capture device of claim 5, wherein a given face is identified as the target face based on proximity of the given face to a bottom edge of the given blurred video frame.

8. The image capture device of claim 5, wherein a given face is identified as the target face based on a user selection of the given face.

9. The image capture device of claim 2, wherein the transmission of the blurred video frames to the computing device includes live streaming of the blurred video frames to the computing device.

10. A method for face blurring, the method performed by an image capture device including an image sensor, an optical element, and one or more processors, the image sensor configured to generate a visual output signal conveying visual information based on light that becomes incident thereon, the visual information defining visual content, the optical element configured to guide light within a field of view to the image sensor, the method comprising:

capturing video frames based on the visual content, the video frames depicting faces, wherein a capture rate defines a rate at which the video frames are captured;

detecting the faces depicted within the video frames, detecting the faces depicted within the video frames including determining positions and sizes of the faces, wherein a face detection rate defines a rate at which the faces are detected within the video frames, the face detection rate slower than the capture rate;

applying a temporal filtering to determine the positions and the sizes of the faces within the video frames in which the detection of the faces has not been performed;

applying a tracking filtering to determine the positions and the sizes of the faces within the video frames in which the detection of the faces has failed;

blurring the video frames based on the positions and the sizes of the faces within the video frames, wherein one or more of the faces within the video frames are blurred; and transmitting the blurred video frames to a computing device, wherein:

a first face is detected in a first video frame, the first face having a first position and a first size in the first video frame;

a second face is detected in a second video frame, the second face having a second position and a second size in the second video frame; and the first face is determined to be the same as the second face based on a distance between the first position of the first face in the first video frame and the second position of the second face in the second video frame being less than a threshold distance; and the threshold distance is determined based on the first size of the first face in the first video frame and the second size of the second face in the second video frame.

11. The method of claim 10, wherein:

the video frames include a first video frame, a second video frame subsequent to the first video frame, and a third video frame subsequent to the second video frame;

the detection of the faces is performed on the first video frame and the third video frame;

the detection of the faces is not performed on the second video frame;

the temporal filtering determines a position of a given face in the second video frame based on a prior position of the given face in the first video frame and a subsequent position of the given face in the third video frame; and the temporal filtering determines a size of the given face in the second video frame based on a prior size of the given face in the first video frame and a subsequent size of the given face in the third video frame.

12. The method of claim 10, wherein:

the video frames include a first video frame and a second video frame subsequent to the first video frame;

the detection of the faces is performed on the first video frame and the second video frame, wherein the detection of the faces fails in the second video frame;

the tracking filtering determines a position of a given face in the second video frame based on a prior position of the given face in the first video frame; and the tracking filtering determines a size of the given face in the second video frame based on a prior size of the given face in the first video frame.

13. The method of claim 10, wherein a target face is not blurred in a given blurred video frame.

14. The method of claim 13, wherein a given face is identified as the target face based on a given size of the given face.

15. The method of claim 13, wherein a given face is identified as the target face based on proximity of the given face to a bottom edge of the given blurred video frame.

16. The method of claim 13, wherein a given face is identified as the target face based on a user selection of the given face.

17. The method of claim 10, wherein transmitting the blurred video frames to the computing device includes live streaming the blurred video frames to the computing device.

* * * * *